United States Patent
Schaffer et al.

(10) Patent No.: US 6,704,931 B1
(45) Date of Patent: Mar. 9, 2004

(54) METHOD AND APPARATUS FOR DISPLAYING TELEVISION PROGRAM RECOMMENDATIONS

(75) Inventors: J. David Schaffer, Wappingers Falls, NY (US); Kwok Pun Lee, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/519,550

(22) Filed: Mar. 6, 2000

(51) Int. Cl.[7] .................... H04N 5/455; G06F 3/00; G06F 13/00
(52) U.S. Cl. ............... 725/46; 725/44; 725/45; 725/47; 725/37
(58) Field of Search ............... 725/44, 45, 46, 725/47, 37, 39

(56) References Cited

U.S. PATENT DOCUMENTS

| | | | |
|---|---|---|---|
| 5,214,622 A | | 5/1993 | Nemoto et al. ............ 368/10 |
| 5,323,240 A | * | 6/1994 | Amano et al. ............ 348/731 |
| 5,758,257 A | | 5/1998 | Herz et al. ............ 455/2 |
| 5,790,935 A | * | 8/1998 | Payton ............ 725/91 |
| 5,793,438 A | | 8/1998 | Bedard ............ 348/569 |
| 5,828,419 A | | 10/1998 | Bruette et al. ............ 563/563 |
| 6,005,597 A | * | 12/1999 | Barrett et al. ............ 725/46 |
| 6,317,881 B1 | * | 11/2001 | Shah-Nazaroff et al. ...... 725/24 |

FOREIGN PATENT DOCUMENTS

| | | | |
|---|---|---|---|
| EP | 0682452 | 5/1995 | H04N/5/445 |
| EP | 0889647 | 7/1998 | H04N/5/445 |
| WO | WO9748230 | 6/1997 | H04N/7/00 |
| WO | WO9807277 | 8/1997 | H04N/7/10 |
| WO | WO9812872 | 9/1997 | H04N/5/44 |

* cited by examiner

Primary Examiner—John Miller
Assistant Examiner—Johnny Ma

(57) ABSTRACT

A method and apparatus for displaying available television programs with an indication of the recommendation score assigned to each program by a television programming recommender, includes a television programming recommender for evaluating each of the programs in an electronic programming guide (EPG) in a conventional manner to identify programs of interest to a particular user. An indication of the numerical recommendation scores associated with each program are also displayed to the user, for example, using program grids listing the available television programs. The numerical recommendation scores can be displayed with each program directly or can be mapped onto a color spectrum or another visual cue, such as a variable size-of-text or rate of blinking, that permits the user to quickly locate programs of interest. Television channels can be sorted in the program grid according to a normalized recommendation score for the time period being examined.

19 Claims, 6 Drawing Sheets

PROGRAM DATABASE - 200

| DATE/TIME 240 | CHANNEL 245 | TITLE 250 | GENRE 255 | ... | RECOMMENDER SCORE 270 |
|---|---|---|---|---|---|
| 11/18/99 -- 8:00 P.M. | CH 1 | LUCY | COMEDY | | 55 |
| 11/18/99 -- 8:30 P.M. | CH 1 | AL'S FAMILY | SITCOM | | 78 |
| ... | | | | | |
| 11/18/99 -- 9:00 P.M. | CH 3 | YOUR HOUSE | DRAMA | | 96 |

ELECTRONIC PROGRAM GUIDE -- 400
(WITH SCORE)

EPG FOR THURSDAY, NOV. 18, 1999 FROM 8 P.M. UNTIL 11 P.M.

| | 8:00 | 8:30 | 9:00 | 9:30 | 10:00 | 10:30 |
|---|---|---|---|---|---|---|
| CH 1 | LUCY <score=55> | AL'S FAMILY <score=78> | | STAR VOYAGER <score=23> | CH 1 NEWS <score=62> | |
| CH 2 | BASEBALL TODAY <score=23> | | INSIDE SPORTS <score=14> | | HOCKEY <score=10> | |
| CH 3 | TONIGHT <score=52> | FAMILY TIME <score=30> | YOUR HOUSE <score=96> | EVENING NEWS <score=69> | HOSPITAL DRAMA <score=88> | |
| ... | | | | | | |
| CH 99 | WORLD NEWS <score=70> | | LOCAL NEWS <score=60> | | NEWSSTAND <score=65> | |

FIG. 4A

ELECTRONIC PROGRAM GUIDE -- 400'
(COLOR CODED)

| | 8:00 | 8:30 | 9:00 | 9:30 | 10:00 | 10:30 |
|---|---|---|---|---|---|---|
| CH 1 | LUCY <yellow> | AL'S FAMILY <green> | | STAR VOYAGER <red> | CH 1 NEWS <light green> | |
| CH 2 | BASEBALL TODAY <red> | | INSIDE SPORTS <dark red> | | HOCKEY <dark red> | |
| CH 3 | TONIGHT <yellow> | FAMILY TIME <red> | YOUR HOUSE <dark green> | EVENING NEWS <light green> | HOSPITAL DRAMA <dark green> | |
| ... | | | | | | |
| CH 99 | WORLD NEWS <light green> | | LOCAL NEWS <light green> | | NEWSSTAND <light green> | |

EPG FOR THURSDAY, NOV. 18, 1999 FROM 8 P.M. UNTIL 11 P.M.

FIG. 4B

ELECTRONIC PROGRAM GUIDE -- 400"
(SIZE OF TEXT)

EPG FOR THURSDAY, NOV. 18, 1999 FROM 8 P.M. UNTIL 11 P.M.

| | 8:00 | 8:30 | 9:00 | 9:30 | 10:00 | 10:30 |
|---|---|---|---|---|---|---|
| CH 1 | LUCY -- ⇒ <yellow> | | AL'S FAMILY -- ⇑ <green> | STAR VOYAGER -- ⇓ <red> | CH 1 NEWS -- ⇑ <light green> | |
| CH 2 | BASEBALL TODAY -- ⇓ <dark red> | | INSIDE SPORTS -- ⇓ <dark red> | | HOCKEY -- ⇓ <dark red> | |
| CH 3 | TONIGHT -- ⇒ <yellow> | FAMILY TIME -- ⇓ <red> | YOUR HOUSE -- ⇑ <dark green> | EVENING NEWS -- ⇑ <light green> | HOSPITAL DRAMA -- ⇑ <dark green> | |
| ⋮ | | | | | | |
| CH 99 | WORLD NEWS -- ⇑ <light green> | | LOCAL NEWS -- ⇑ <light green> | | NEWSSTAND -- ⇑ <light green> | |

FIG. 4C

METHOD AND APPARATUS FOR DISPLAYING TELEVISION PROGRAM RECOMMENDATIONS

BACKGROUND OF THE INVENTION

1. Field of the Invention

The present invention relates to television program recommenders, and more particularly, to a method and apparatus for displaying television program recommendations.

2. Description of the Related Art

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGS, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Thus, such tools for recommending television programming provide selections of programs that a viewer might like. Even with the aid of such program recommenders, however, it is still difficult for a viewer to identify programs of interest from among all the options. A need therefore exists for a method and apparatus for displaying television program recommendations in a more efficient manner. A further need exists for a method and apparatus for displaying television program recommendations for a large number of shows in a manner that permits a user to efficiently process the recommendations to identify the best shows of interest.

SUMMARY OF THE INVENTION

Generally, a method and apparatus are disclosed for displaying available television programs with an indication of the numerical recommendation score assigned to each program by a television programming recommender. The program and corresponding recommendation score information can be presented to the user, for example, using grids listing the available television programs by time and date, channel and title.

According to a feature of the invention, the numerical recommendation scores associated with each program are also displayed to the user. The numerical recommendation scores can be displayed with each program directly or can be mapped onto a color spectrum or another visual cue, such as a variable size-of-text or rate of blinking, that permits the user to quickly locate programs of interest. The visual cues are then applied to each program in the program grid in accordance with the present invention.

The present invention can also sort the television channels in the program grid according to a normalized recommendation score for the time period being examined. For a given half-hour time interval, the program grid can be sorted directly by the numerical recommendation scores, such that programs with the highest scores appear at the top of the program grid listing. Likewise, for time intervals larger than a half hour, a normalized score can be assigned to each channel for the time period of interest and the program grid can then be sorted based on the normalized scores, such that channels with the highest normalized scores for the time period of interest appear at the top of the program grid listing.

A more complete understanding of the present invention, as well as further features and advantages of the present invention, will be obtained by reference to the following detailed description and drawings.

BRIEF DESCRIPTION OF THE DRAWINGS

FIG. 2 illustrates a sample table from the program database of FIG. 1;

FIG. 4A is a sample table from the electronic program guide in accordance with one embodiment of the invention;

FIG. 4B is a sample table from the electronic program guide in accordance with a second embodiment of the invention; and FIG. 4C is a sample table from the electronic program guide in accordance with a third embodiment of the invention.

DESCRIPTION OF THE PREFERRED EMBODIMENTS

Figure 1:
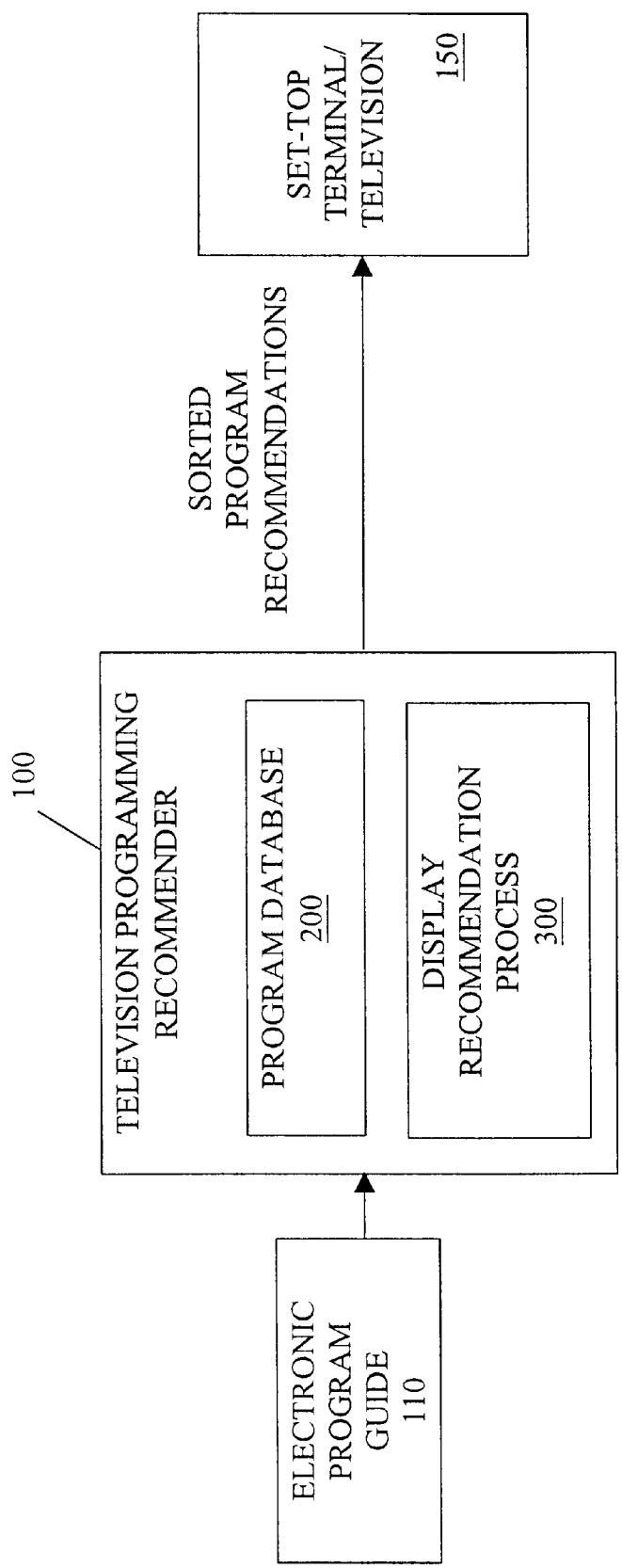
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 110 to identify programs of interest to a particular user. The set of recommended programs can be presented to the user using a set-top terminal/television 150, for example, using well-known on-screen presentation techniques.

According to one feature of the present invention, the available programs are displayed together with an indication of the numerical recommendation score assigned to each program by the television programming recommender 100.

The programs can be presented, for example, using grids listing the available television programs by time and date, channel and title. In further variations the numerical recommendation scores can be mapped onto a color spectrum or another visual cue, such as, size-of-text or rate of blinking, that permits the user to quickly locate programs of interest. In yet another variation, the numerical recommendation scores can be mapped onto a variable brightness scale (gray scale). These visual cues can then be applied to each program in the program grid.

For example, in an implementation where the television programming recommender 100 assigns a numerical recommendation score between 0 and 100 to each program, the numerical recommendation score assigned to each program can be mapped to a color spectrum or a size-of-text visual cue in the following manner:

| RECOMMENDER SCORE | COLOR | FONT SIZE/ THUMBS UP-DOWN |
|---|---|---|
| 0–15 | DARK RED | 10/⇓ |
| 16–30 | RED | 10/⇓ |
| 31–45 | LIGHT RED | 10/⇓ |
| 46–55 | YELLOW | 12/⇒ |
| 56–70 | LIGHT GREEN | 14/⇑ |
| 71–85 | GREEN | 16/⇑ |
| 86–100 | DARK GREEN | 18/⇑ |

In a further variation of the present invention, the television channels can be sorted in the program grid according to a normalized recommendation score for the time period being examined. For example, for a given half-hour time interval, the program grid can be sorted directly by numerical recommendation scores, such that programs with the highest scores appear at the top of the program grid listing. Likewise, for time intervals larger than a half hour, a normalized score can be assigned to each channel for the time period of interest and the program grid can then be sorted by the normalized scores, such that channels with the highest normalized scores for the time period of interest appear at the top of the program grid listing.

As shown in FIG. 1, the television programming recommender 100 contains a program database 200, discussed further below in conjunction with FIG. 2, and a display recommendation processor 300, discussed further below in conjunction with FIG. 3. Generally, the program database 200 records information for each program that is available in a given time interval. The display recommendation processor 300 displays the available programs together with an indication of the numerical recommendation score assigned to each program by the television programming recommender 100.

The television programming recommender 100 may be embodied as any known television program recommender, such as, the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees," and U.S. patent application Ser. No. 09/498,271, filed Feb. 4, 2000, entitled "Adaptive TV Program Recommender,", as modified herein to carry out the features and functions of the present invention.

FIG. 2 is a sample table from the program database 200 of FIG. 1 that records information for each program that is available in a given time interval. As shown in FIG. 2, the program database 200 contains a plurality of records, such as records 205, 210, . . . , 220, each associated with a given program. For each program, the program database 200 indicates the date/time and channel associated with the program in fields 240 and 245, respectively. In addition, the title and genre for each program are identified in fields 250 and 255. Additional well-known attributes (not shown), such as actors, duration, and description of the program, can also be included in the program database 200.

In accordance with one feature of the present invention, the program database 200 also records an indication of the numerical recommendation score assigned to each program by the television programming recommender 100 in field 270. In this manner, the numerical recommendation scores can be displayed to the user in the electronic program guide with each program directly or mapped onto a color spectrum or another visual cue that permits the user to quickly locate programs of interest.

Figure 3:
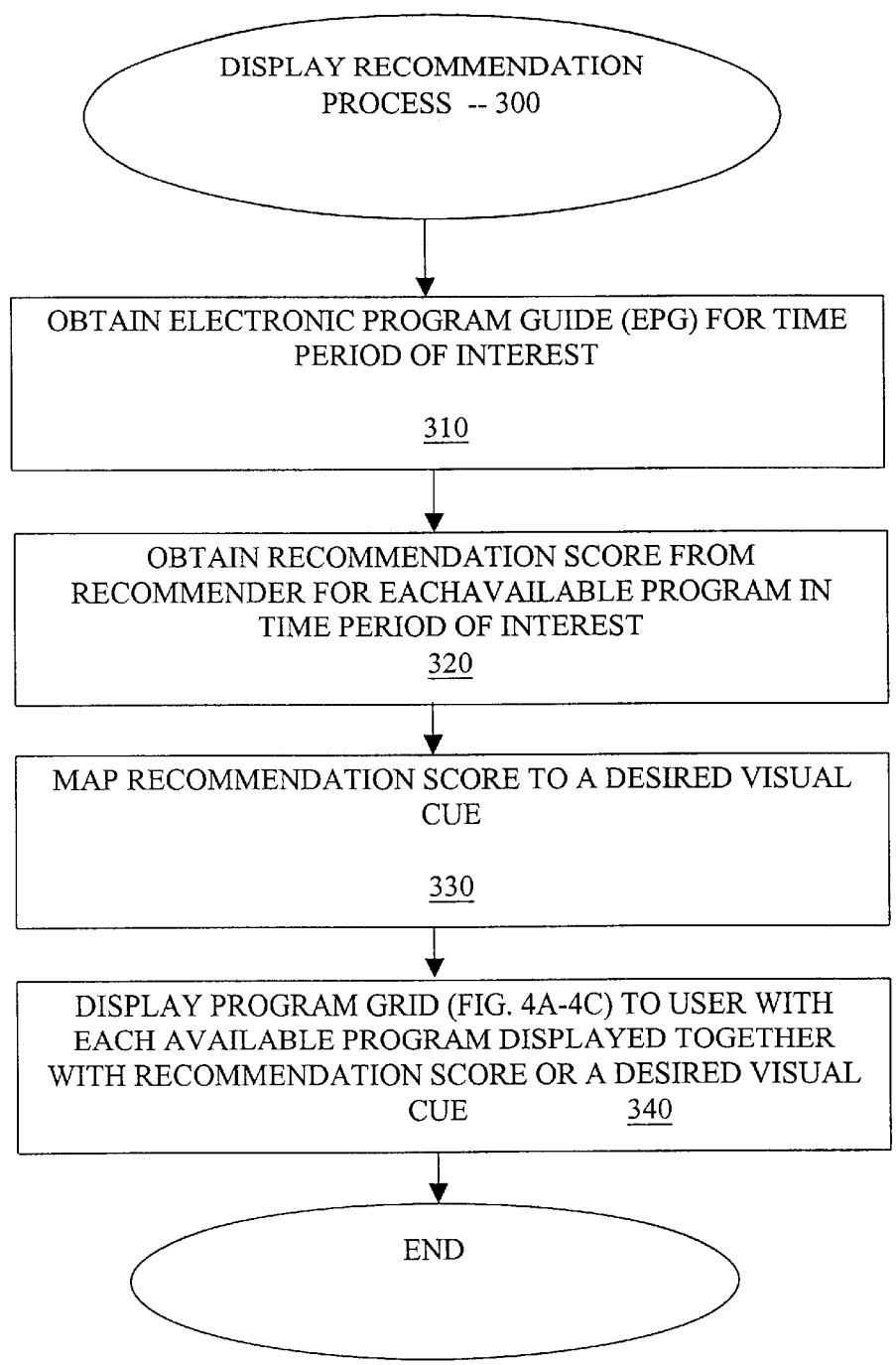
FIG. 3 is a flowchart describing an exemplary display recommendation process embodying principles of the present invention.

FIG. 3 is a flowchart describing an exemplary display recommendation processor 300 embodying principles of the present invention. As shown in FIG. 3, the display recommendation processor 300 initially obtains the electronic program guide (EPG) 110 during step 310 for the time period of interest. Thereafter, the display recommendation processor 300 obtains the numerical recommendation score from the recommender 100 for each available program in time period of interest during step 320. The display recommendation processor 300 then maps the numerical recommendation score to a desired visual cue, such as, color or size-of-text, during step 330. Finally, the display recommendation processor 300 displays the modified program grid to the user during step 340 with each available program displayed together with the numerical recommendation score or the desired visual cue. The user can thereafter interact with the modified program grid using known techniques, for example, to select programs, automatically record programs or to program warnings that will automatically notify the user when a particular program is being presented.

FIG. 4A is a sample table from an electronic program guide 400 in accordance with a first embodiment of the invention. Specifically, the embodiment of FIG. 4A presents each program together with the numerical recommendation score directly. Thus, a user can review the electronic program guide 400 and quickly identify the programs having the highest scores.

FIG. 4B is a sample table from an electronic program guide 400' in accordance with a second embodiment of the invention. Specifically, the embodiment of FIG. 4B presents each program together with a mapping of the numerical recommendation score onto a color scheme, in the manner described above. It is noted that for a color mapping implementation, a range of scores can be discretely mapped to a given color, as discussed above, or a score can be mapped to a color in a continuous fashion. Thus, a user can review the electronic program guide 400' and quickly identify the programs with dark green, associated with the mostly strongly recommended programs.

FIG. 4C is a sample table from an electronic program guide 400' in accordance with a third embodiment of the invention. Specifically, the embodiment of FIG. 4C presents each program together with a mapping of the numerical recommendation score onto a size-of-text scheme, in the manner described above. Thus, a user can review the electronic program guide 400' and quickly identify the programs with a "thumbs up" symbol (⇑) and printed with the largest font.

As previously indicated, a further variation of the invention allows the television channels to be sorted in the program grid according to a normalized recommendation score for the time period being examined. For example, for a given half-hour time interval, the program grid can be sorted directly by numerical recommendation scores, such that programs with the highest scores appear at the top of the program grid listing. Likewise, for time intervals larger than a half hour, a normalized score can be assigned to each channel for the time period of interest and the program grid can then be sorted by the normalized scores, such that channels with the highest normalized scores for the time period of interest appear at the top of the program grid listing.

In one illustrative implementation, a normalized score for a channel can be computed in the following manner. First, the scores $s_1, s_2, \ldots, s_n$ (where $0 < s_i < 100$) of all the programs to be shown on the channel in a given time period are obtained. Thereafter, each score $s_i$ is adjusted by a weighting factor $w_i$. The normalized score for the channel is the sum of these adjusted weights $w_1 * s_1 + w_2 * s_2 + \ldots + w_n * s_i$. The weighting factor can be found as follows. If $s_i$ is >95, then $w_i = 100$; if $s_i$ is less than 95 but greater than 50, then $w_i = 10$. If $s_i$ is less than or equal to 50, then $w_i = 1$. The effect is to give a heavy weight to highly recommended shows and a smaller weight to not so highly recommended shows (and unit weight to neutral and not recommended shows). Channels with more recommended shows will get higher normalized scores. Of course, variations on this normalization scheme exist, as would be readily apparent to one of ordinary skill in the art.

It is to be understood that the embodiments and variations shown and described herein are merely illustrative of the principles of this invention and that various modifications may be implemented by those skilled in the art without departing from the scope and spirit of the invention.

What is claimed is:

1. In a television system including a television receiver and a television program recommender for recommending television programs based on preferences of a user of the television system, a method for displaying available television programs, comprising the steps of:

obtaining a list of available programs in a given time interval, a plurality of said available programs being presented on at least one of a plurality of program channels;

generating a numerical recommendation score for each of said available programs based on preferences of a particular user of the television system;

calculating a separate normalized recommendation score for each of said program channels using said numerical recommendation scores;

sorting said list of program channels based on said normalized recommendation scores; and displaying said available programs according to said normalized recommendation scores of their respective channels.

2. The method as claimed in claim 1, wherein said normalized recommendation score for each of said program channels, NS, is calculated using the formula:

$$NS = w_1 * s_1 + w_2 * s_2 + \ldots + w_n * s_n,$$

where $s_n$ and $w_n$, correspond, respectively, to a score and a weighting factor for each program, n, to be shown on said channel in said given time interval.

3. The method as claimed in claim 1, wherein said displaying step further comprises:

providing an indication of said numerical recommendation scores for said available programs in their respective channels.

4. The method as claimed in claim 3, wherein said indication of said numerical recommendation score provides said numerical recommendation score directly.

5. The method as claimed in claim 3, wherein said indication of said numerical recommendation score maps said numerical recommendation score onto a color scheme.

6. The method as claimed in claim 5, wherein said color scheme discretely maps said score to a color.

7. The method as claimed in claim 5, wherein said color scheme continuously maps said score to a color.

8. The method as claimed in claim 3, wherein said indication of said numerical recommendation score maps said numerical recommendation score onto a variable size-of-text scheme.

9. The method as claimed in claim 3, wherein said indication of said numerical recommendation score maps said numerical recommendation score onto a variable rate-of-flicker scheme.

10. The method as claimed in claim 3, wherein said indication of said numerical recommendation score maps said numerical recommendation score onto a variable brightness scheme.

11. A television system, including a television receiver and a television program recommender for recommending television programs based on preferences of a user of the television system, for displaying available television programs, comprising:

a memory for storing computer readable code; and a processor operatively coupled to said memory and sari television program recommender, said processor configured to:

obtain a list of available programs in a given time interval, a plurality of said available programs being presented on at least one of a plurality of program channels; obtain a recommendation score from said television program recommender for each of said available programs based on preferences of a particular user of the television system;

calculate a normalized recommendation score for each of said program channels using said numerical recommendation scores;

sort said list of program channels based on said normalized recommendation scores; and display said available programs according to said normalized recommendation scores of their respective channels.

12. The system as claimed in claim 11, wherein said processor, when displaying said available programs, further provides an indication of said numerical recommendation scores for said available programs in their respective channels.

13. The system as claimed in claim 12, wherein said indication of said numerical recommendation scores provides said numerical recommendation scores directly.

14. The system as claimed in claim 12, wherein said indication of said numerical recommendation score maps said numerical recommendation score onto a color scheme.

15. The system as claimed in claim 14, wherein said color scheme discretely maps said score to a color.

16. The system as claimed in claim 14, wherein said color scheme continuously maps said score to a color.

17. The system as claimed in claim 12, wherein said indication of said numerical recommendation score maps said numerical recommendation score onto a variable size-of-text scheme.

18. The system as claimed in claim 12, wherein said indication of said numerical recommendation score maps said numerical recommendation score onto a variable rate-of-flicker scheme.

19. The system as claimed in claim 12, wherein said indication of said numerical recommendation score maps said numerical recommendation score onto a variable brightness scheme.

\* \* \* \* \*